(12) United States Patent
Ratasuk et al.

(10) Patent No.: US 9,603,160 B2
(45) Date of Patent: Mar. 21, 2017

(54) METHOD AND APPARATUS FOR UPLINK BACKHAUL SCHEDULING

(71) Applicant: NOKIA SOLUTIONS AND NETWORKS OY, Espoo (FI)

(72) Inventors: Rapeepat Ratasuk, Hoffman Estates, IL (US); Mark Cudak, Rolling Meadows, IL (US); Frederick Vook, Schaumburg, IL (US); Amitabha Ghosh, Buffalo Grove, IL (US); Jun Tan, Lake Zurich, IL (US); Anup Talukdar, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/285,101

(22) Filed: May 22, 2014

(65) Prior Publication Data

US 2015/0341948 A1 Nov. 26, 2015

(51) Int. Cl.
| | |
|---|---|
| *H04W 4/00* | (2009.01) |
| *H04W 72/12* | (2009.01) |
| *H04L 1/18* | (2006.01) |
| *H04W 84/04* | (2009.01) |

(52) U.S. Cl.
CPC ......... *H04W 72/1247* (2013.01); *H04L 1/189* (2013.01); *H04W 72/1284* (2013.01); *H04W 84/047* (2013.01)

(58) Field of Classification Search
CPC ............. H04W 72/1247; H04W 72/12; H04W 72/1226; H04W 72/1242; H04W 72/1278; H04W 72/1284; H04W 72/1294; H04L 1/189
See application file for complete search history.

(56) References Cited

U.S. PATENT DOCUMENTS

| | | | |
|---|---|---|---|
| 8,948,772 B2 * | 2/2015 | Eerolainen | ........ H04W 72/0413 455/434 |
| 2007/0201397 A1 | 8/2007 | Zhang | |
| 2009/0052387 A1 * | 2/2009 | Lee | ........ H04W 28/06 370/329 |

(Continued)

FOREIGN PATENT DOCUMENTS

| | | |
|---|---|---|
| EP | 2 549 708 A1 | 1/2013 |
| WO | 2011/020062 A2 | 2/2011 |
| WO | 2013044497 A1 | 4/2013 |

OTHER PUBLICATIONS

WO Search Report application No. PCT/EP2015/061042 mailed Aug. 5, 2015.

(Continued)

*Primary Examiner* — Kevin Mew
(74) *Attorney, Agent, or Firm* — Squire Patton Boggs (US) LLP

(57) ABSTRACT

A method and apparatus can be configured to receive a first scheduling request. The first scheduling request corresponds to a request for a first access point to process data. The method can also include transmitting a second scheduling request. The second scheduling request corresponds to a request to transmit data to a second access point. The transmitting the second scheduling request comprises transmitting the second scheduling request before the data is processed at the first access point.

40 Claims, 10 Drawing Sheets

(56) References Cited

U.S. PATENT DOCUMENTS

| | | | |
|---|---|---|---|
| 2009/0185521 A1* | 7/2009 | Li | H04B 1/7107 370/315 |
| 2009/0291701 A1* | 11/2009 | Zetterman | H04W 72/1215 455/509 |
| 2010/0167665 A1* | 7/2010 | Zetterman | H04B 1/0003 455/78 |
| 2010/0215004 A1* | 8/2010 | Yoo | H04L 1/0031 370/329 |
| 2010/0284354 A1* | 11/2010 | Ostergaard | H04W 72/1284 370/329 |
| 2011/0269393 A1 | 11/2011 | Ostergaard et al. | |
| 2012/0084618 A1* | 4/2012 | Choudhury | H03M 13/136 714/752 |
| 2012/0106433 A1* | 5/2012 | Seo | H04B 7/155 370/315 |
| 2012/0182878 A1* | 7/2012 | Qian | H04B 7/155 370/242 |
| 2012/0230245 A1* | 9/2012 | Ostergaard | H04W 72/0426 370/315 |
| 2012/0250604 A1* | 10/2012 | Lindholm | H04W 84/047 370/315 |
| 2012/0295652 A1* | 11/2012 | Eerolainen | H04W 72/0413 455/509 |
| 2012/0302274 A1* | 11/2012 | Ohta | H04W 72/042 455/509 |
| 2013/0003650 A1* | 1/2013 | Han | H04B 7/155 370/315 |
| 2013/0163536 A1* | 6/2013 | Anderson | H04W 72/1284 370/329 |
| 2013/0163537 A1* | 6/2013 | Anderson | H04W 72/1284 370/329 |
| 2014/0018120 A1* | 1/2014 | Anbe | H04W 28/048 455/509 |
| 2014/0119262 A1* | 5/2014 | Park | H04W 4/06 370/312 |
| 2014/0342747 A1* | 11/2014 | Lee | H04L 5/0053 455/450 |
| 2015/0049697 A1* | 2/2015 | Worrall | H04W 72/0413 370/329 |
| 2015/0071248 A1* | 3/2015 | Faerber | H04W 36/04 370/331 |
| 2015/0117319 A1* | 4/2015 | Yang | H04W 74/004 370/329 |
| 2015/0223264 A1* | 8/2015 | Cheng | H04W 72/1278 370/329 |
| 2015/0373737 A1* | 12/2015 | Park | H04L 1/16 370/329 |

OTHER PUBLICATIONS

European Patent Office, International Search Report and Written Opinion for corresponding International Patent Application No. PCT/EP2015/061042, Oct. 28, 2015.

\* cited by examiner

METHOD AND APPARATUS FOR UPLINK BACKHAUL SCHEDULING

BACKGROUND

Field

Embodiments of the invention relate to performing uplink backhaul scheduling.

Description of the Related Art

5th generation (5G) wireless systems refer to an upcoming standard for wireless communication that seeks to provide improved speed and capacity for wireless communications by using new modulation/signal processing techniques. 5G will likely include capabilities beyond the capabilities that are currently defined by 4G standards. 5G will likely be deployed in a wide variety of contexts involving the communication of data.

SUMMARY

According to a first embodiment, a method may include receiving, by a first access point, a first scheduling request. The first scheduling request corresponds to a request for the first access point to process data. The method an also include transmitting, by the first access point, a second scheduling request. The second scheduling request corresponds to a request to transmit data to a second access point. The transmitting the second scheduling request includes transmitting the second scheduling request before the data is processed at the first access point.

In the method of the first embodiment, the processing data by the first access point includes at least one of receiving the data or decoding the data.

In the method of the first embodiment, the method also includes processing data at the first access point and transmitting the data to the second access point, wherein the transmission of the data corresponds to a hop of a multi-hop transmission.

In the method of the first embodiment, the first access point corresponds to a tier of a multi-tier topology.

In the method of the first embodiment, the data is transmitted towards an egress point.

In the method of the first embodiment, transmitting the second scheduling request includes transmitting a scheduling request that indicates one or more of priority, packet destination, routing information, or configuration parameters.

In the method of the first embodiment, the first access point includes an access point of a mmWave system.

In the method of the first embodiment, the first access point is configured to adapt between a fast-scheduling request and a regular-scheduling request, and the first access point (1) determines that the fast-scheduling request is to be used, and/or (2) receives an indication that the fast-scheduling request is to be used.

In the method of the first embodiment, the data is transmitted to the second access point after the processing the data at the first access point.

In the method of the first embodiment, the data is transmitted using unacknowledged mode.

In the method of the first embodiment, the method can also include determining, by the first access point, whether data is intended for the network based on the format or content of the first scheduling request.

In the method of the first embodiment, the method can also include adjusting, by the first access point, data packet configuration parameters based on the format or content of the first scheduling request.

In the method of the first embodiment, the method further includes transmitting data to the second access point before decoding the data, when the fast-scheduling request is determined or indicated.

In the method of the first embodiment, the method can also include correcting, by the first access point, the data using Automatic-Repeat-Request if the data cannot be decoded at the egress point.

According to a second embodiment, an apparatus may include at least one processor. The apparatus may also include at least one memory including computer program code. The at least one memory and the computer program code may be configured, with the at least one processor, to cause the apparatus at least to receive a first scheduling request. The first scheduling request corresponds to a request for the apparatus to process data. The apparatus may also be caused to transmit a second scheduling request. The second scheduling request corresponds to a request to transmit data to an access point. The transmitting the second scheduling request includes transmitting the second scheduling request before the data is processed at the apparatus.

In the apparatus of the second embodiment, the processing data by the apparatus includes at least one of receiving the data or decoding the data.

In the apparatus of the second embodiment, the apparatus is further caused to process data and transmit the data to the access point, wherein the transmission of the data corresponds to a hop of a multi-hop transmission.

In the apparatus of the second embodiment, the apparatus corresponds to a tier of a multi-tier topology.

In the apparatus of the second embodiment, the data is transmitted towards an egress point.

In the apparatus of the second embodiment, transmitting the second scheduling request includes transmitting a scheduling request that indicates one or more of priority, packet destination, routing information, or configuration parameters.

In the apparatus of the second embodiment, the apparatus includes an access point of a mmWave system.

In the apparatus of the second embodiment, the apparatus may be configured to adapt between a fast-scheduling request and a regular-scheduling request. The apparatus (1) determines that the fast-scheduling request is to be used, and/or (2) receives an indication that the fast-scheduling request is to be used.

In the apparatus of the second embodiment, the data is transmitted to the access point after the processing the data at the apparatus.

In the apparatus of the second embodiment, the data is transmitted using unacknowledged mode.

In the apparatus of the second embodiment, the apparatus is further caused to determine whether data is intended for the network based on the format or content of the first scheduling request.

In the apparatus of the second embodiment, the apparatus is further caused to adjust data packet configuration parameters based on the format or content of the first scheduling request.

In the apparatus of the second embodiment, the apparatus is further caused to transmit data to the second access point before decoding the data, when the fast-scheduling request is determined or indicated.

In the apparatus of the second embodiment, the apparatus may also be caused to correct the data using Automatic-Repeat-Request if the data cannot be decoded at the egress point.

According to a third embodiment, a computer program product may be embodied on a non-transitory computer readable medium, the computer program product may be configured to control a processor to perform a process, including receiving, by a first access point, a first scheduling request. The first scheduling request corresponds to a request for the first access point to process data. The process may also include transmitting, by the first access point, a second scheduling request. The second scheduling request corresponds to a request to transmit data to a second access point. The transmitting the second scheduling request includes transmitting the second scheduling request before the data is processed at the first access point.

According to a fourth embodiment, a method may include selecting, by a user equipment, a first scheduling request. The selecting the first scheduling request includes selecting between scheduling request types. The method may also include transmitting the first scheduling request to an access point. The first scheduling request corresponds to a request for the access point to process data.

In the method of the fourth embodiment, the selecting between scheduling request types includes selecting between a fast-scheduling request and a regular-scheduling request.

In the method of the fourth embodiment, the method may also include transmitting data to the access point. Transmitting the first scheduling request to the access point causes the access point to transmit a second scheduling request before processing the transmitted data. The processing of the transmitted data by the access point includes at least one of receiving the transmitted data or decoding the transmitted data.

In the method of the fourth embodiment, the transmitting of the data corresponds to a hop of a multi-hop transmission.

In the method of the fourth embodiment, the transmitting of the data is transmitting towards an egress point.

In the method of the fourth embodiment, the selecting the first scheduling request is based on one or more of destination, priority, type, and delay budget of the data.

In the method of the fourth embodiment, a modulation-and-coding-scheme is based on the scheduling request type.

In the method of the fourth embodiment, the first scheduling request causes the access point to transmit data before decoding the data, when the fast-scheduling request is selected.

In the method of the fourth embodiment, further including correcting, by the user equipment, the data using Automatic-Repeat-Request if the data cannot be decoded at the egress point.

According to a fifth embodiment, an apparatus may include at least one processor. The apparatus may also include at least one memory including computer program code. The at least one memory and the computer program code may be configured, with the at least one processor, to cause the apparatus at least to select a first scheduling request. The selecting the first scheduling request includes selecting between scheduling request types. The apparatus may also be caused to transmit the first scheduling request to an access point. The first scheduling request corresponds to a request for the access point to process data.

In the apparatus of the fifth embodiment, the selecting between scheduling request types includes selecting between a fast-scheduling request and a regular-scheduling request.

In the apparatus of the fifth embodiment, the apparatus is further caused to transmit data to the access point. Transmitting the first scheduling request to the access point causes the access point to transmit a second scheduling request before processing the transmitted data. The processing of the transmitted data by the access point includes at least one of receiving the transmitted data or decoding the transmitted data.

In the apparatus of the fifth embodiment, the transmitting of the data corresponds to a hop of a multi-hop transmission.

In the apparatus of the fifth embodiment, the transmitting of the data is transmitting towards an egress point.

In the apparatus of the fifth embodiment, the selecting the first scheduling request is based on one or more of destination, priority, type, and delay budget of the data.

In the apparatus of the fifth embodiment, a modulation-and-coding-scheme is based on the scheduling request type.

In the apparatus of the fifth embodiment, the first scheduling request causes the access point to transmit data before decoding the data, when the fast-scheduling request is selected.

In the apparatus of the fifth embodiment, the apparatus may be further caused to correct the data using Automatic-Repeat-Request if the data cannot be decoded at the egress point.

According to a sixth embodiment, a computer program product may be embodied on a non-transitory computer readable medium. The computer program product may be configured to control a processor to perform a process, including selecting, by a user equipment, a first scheduling request. The selecting the first scheduling request includes selecting between scheduling request types. The process may include transmitting the first scheduling request to an access point. The first scheduling request corresponds to a request for the access point to process data.

BRIEF DESCRIPTION OF THE DRAWINGS

For proper understanding of the invention, reference should be made to the accompanying drawings, wherein.

DETAILED DESCRIPTION

Embodiments of the present invention relate to performing uplink backhaul scheduling within a wireless system. 5th generation (5G) wireless systems will generally propose an access architecture for deploying cellular-radio equipment that employ a millimeter wave (mmWave) radio spectrum. The availability of (1) a wide bandwidth (for example, an opening of a 13 GHz spectrum in the 70-80 GHz band) coupled with (2) the use of large antenna arrays with as many as 8 to 64 elements (which can achieve 9 to 18 dB in link budget gain) make this band attractive for deploying high-capacity 5G networks.

However, because the range of a mmWave Access Point (AP) is generally limited (to a range of around 100 m), a large number of mmWave APs may be required to cover a desired area. When a large number of mmWave APs are required to cover an area, providing wired backhaul to all the APs may not be practical. As a result of not providing wired backhaul to all the APs, there may only be a few direct connections to the network (a limited number of egress points).

Figure 1:
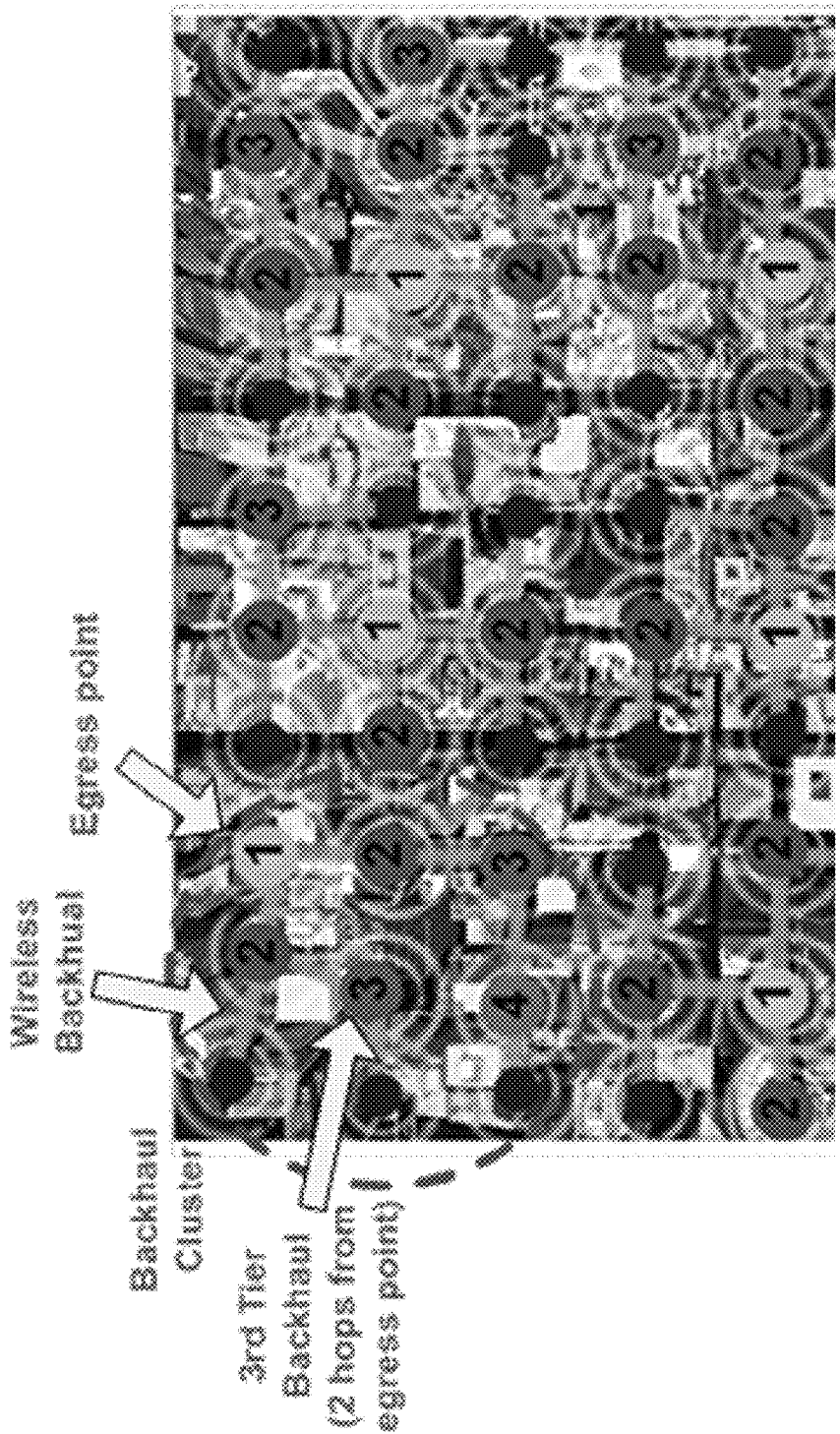
FIG. 1 illustrates access points of a mmWave system in accordance with one embodiment.

FIG. 1 illustrates access points of a mmWave system in accordance with one embodiment. Access points of the mmWave system generally allow access to the network via wireless backhaul links. In the interest of saving costs, access and wireless backhaul can share a same band (i.e., an in-band backhaul). In some circumstances, there may be multiple hops between an access point and an egress point, as described in more detail below.

FIG. 1 also illustrates the location of the APs and the associated backhaul links. Each egress point is identified by a "1," which identifies each egress point as a first-tier backhaul cell master. All APs that are one hop away from the egress point become subordinates on a second-tier backhaul. Furthermore, all APs that are one hop away from an egress point will generally be considered to be second-tier backhaul cell masters if there are any other APs connected further away from the egress point. All second-tier backhaul cell masters are denoted by a "2." Similarly, the third-tier and fourth-tier backhaul cell masters are denoted by a "3" and a "4," respectively. In the example shown in FIG. 1, there may be no APs that are more than 4 hops away from an egress point. However, other examples can use any number of tiers.

Figure 2:
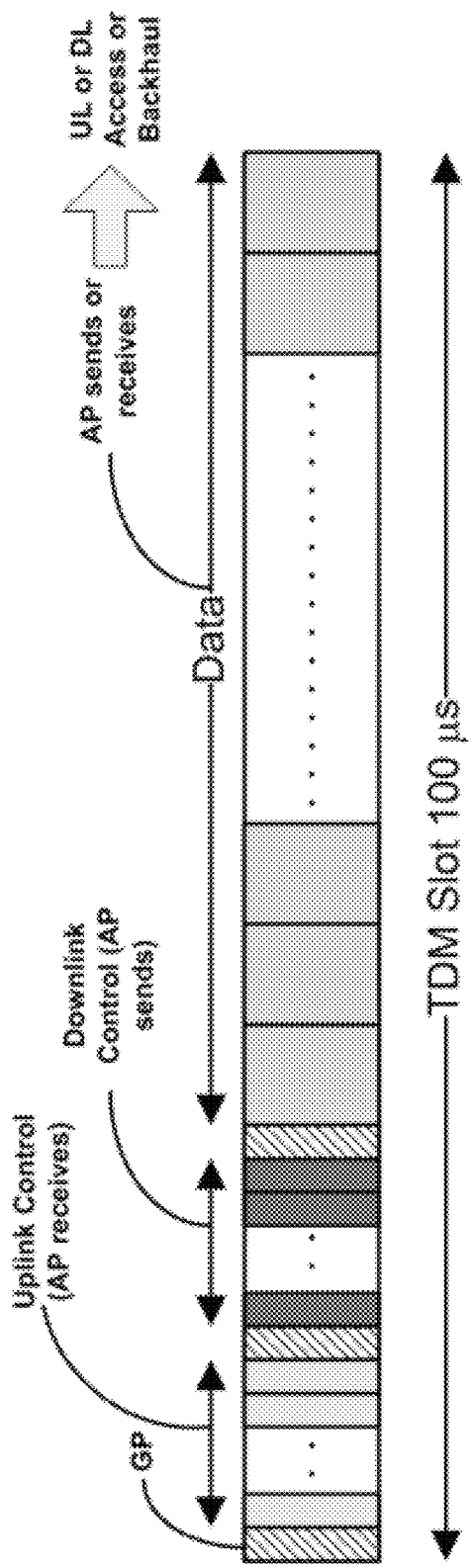
FIG. 2 illustrates Time-Division Duplex (TDD) with a slot structure in accordance with one embodiment.

FIG. 2 illustrates Time-Division Duplex (TDD) with a slot structure in accordance with one embodiment. As described above, certain embodiments of the present invention can be directed to a 5G mmWave system. A data portion can be dynamic and can be used to transmit data in either uplink (UL) or downlink (DL), as well as for access or backhaul. Access communication is generally considered to be communication between a user equipment (UE) and an access point. Backhaul communication is generally considered to be communication between an access point and another access point (such as with wireless backhaul), or communication between an access point and a core network (such as with wired backhaul). The slot structure may also allow the AP to dynamically schedule backhaul or access, thus eliminating the drawbacks corresponding to semi-static configuration. A mmWave system may use directional and narrow-beam transmission, and thus, no interference is expected when supporting UL and DL simultaneously on different cells.

A 5G system may exhibit low latency on the order of 1 ms (as compared to 10 ms for Long Term Evolution (LTE) systems). However, as previously described, because the range of a mmWave AP is generally limited, a large number of APs may be required to cover a desired area. Because a large number of APs may be required to cover the desired area, providing wired backhaul to all APs may not be practical, and a multi-hop wireless backhaul topology may need to be used. For some APs, the number of hops can be large. For example, as illustrated in FIG. 1, one embodiment can use a topology with four tiers. With a four-tier topology, users that are attached to a fourth-tier AP will require 3 hops before the data will reach the egress point (i.e., before the data will reach the network). When using multiple hops to reach an egress point, these multiple hops may introduce significant delay, especially in the uplink.

Referring again to FIG. 1, in order for a user equipment (UE) that is attached to the fourth-tier AP to transmit the UE's data to the network, the following sequence of events will generally occur. As described above, although the example of FIG. 1 uses a four-tier arrangement, other examples may use more or less tiers.

Referring to FIG. 1, first, the UE sends a scheduling request to the fourth-tier AP. Next, the fourth-tier AP schedules the UE for data transmission. Next, the UE transmits data and the fourth-tier AP attempts to decode the transmitted data. The transmitting of data and the attempting to decode the transmitted data can be repeated multiple times (for example, with hybrid-automatic-repeat request (HARQ)), if there are transmission errors. Next, the fourth-tier AP examines the content of the data packet. After determining that the data is intended for the network, the fourth-tier AP sends a scheduling request to a third-tier AP. Next, the previous steps are repeated until the data eventually arrives at a first-tier AP (corresponding to an egress point).

When the above-described steps are performed, delay is generally introduced. The introduced delay is due to the need for the backhaul APs to decode the data, make the appropriate scheduling requests, and then wait to be scheduled. In some cases, this introduced delay may be acceptable (for example, with delay-tolerant traffic). However, there are other situations (for example, with delay-sensitive traffic) where this introduced delay is not acceptable.

In view of the above, a method for performing a fast backhaul scheduling may be desirable in order to quickly transmit necessary information up to the network when the above-described introduced delay is not acceptable.

One previous approach for transmitting data includes a method for performing cut-through switching (such as via Ethernet). In this previous approach, a switch determines a destination address for a data packet and starts forwarding the packet before the entire packet has been received at the switch.

In another previous approach, a method can semi-statically assign resources to user equipment (UE). This semi-static assigning is usually performed when the UE has periodic data to transmit in order to save control overhead. The semi-static assigning can also be used to reduce a delay for UE-originated traffic. However, this previous approach is generally very inflexible and generally consumes a lot of resources. As such, this previous approach is not a preferred method for solving delay/latency problems.

In view of the shortcomings of the previous approaches, a method for performing a fast backhaul scheduling may be desirable in order to quickly transmit necessary information up to the network when the above-described introduced delay is not acceptable. As described above, in embodiments of the present invention, a multi-hop system can include one egress point and can include tiers of APs. The egress point can have a wired backhaul to the network while the tiered APs can have a wireless backhaul connection to a corresponding previous tier.

In embodiments of the present invention, an access and a backhaul can share a same band to save costs, as in the case of an in-band backhaul. With a system that uses "m" tiers, an $m^{th}$-tier AP can schedule an $(m+1)^{th}$-tier AP for backhaul. For example, a $2^{nd}$-tier AP can schedule a $3^{rd}$-tier AP. Downlink/Uplink (DL/UL) control switching can occur in a slot between tiers to allow for the receiving of a grant from a previous tier AP. A slot format can be based on an AP's tier in the multi-hop network.

In embodiments of the present invention, APs may pre-request scheduling for the next hop prior to actually receiving the data packet at the AP. The timing of the hops can be determined according to the length of time for processing the data packet at the AP. In embodiments of the present invention, two different scheduling requests can be used. One scheduling request can be a "regular" scheduling request, and the other scheduling request can be a "fast" scheduling request. With the "fast" scheduling request, the "fast" scheduling request can trigger the scheduling of a pre-request for the next hop.

In embodiments of the present invention, the UE/AP that requests a fast-scheduling request can adjust a modulation-and-coding-scheme (MCS) of the data packet to ensure that the data packet is received directly by a subsequent tier. For example, a normal MCS can target a 10% frame-error rate (FER), but an adjusted MCS can target a smaller FER (such as a 0.1% FER, for example). The adjusted MCS can correspond to a fixed step down of 2-3 MCS levels.

In embodiments of the present invention, routing information may be contained in the scheduling request, and configuration parameters can be included in the packet or in the scheduling request.

Figure 3:
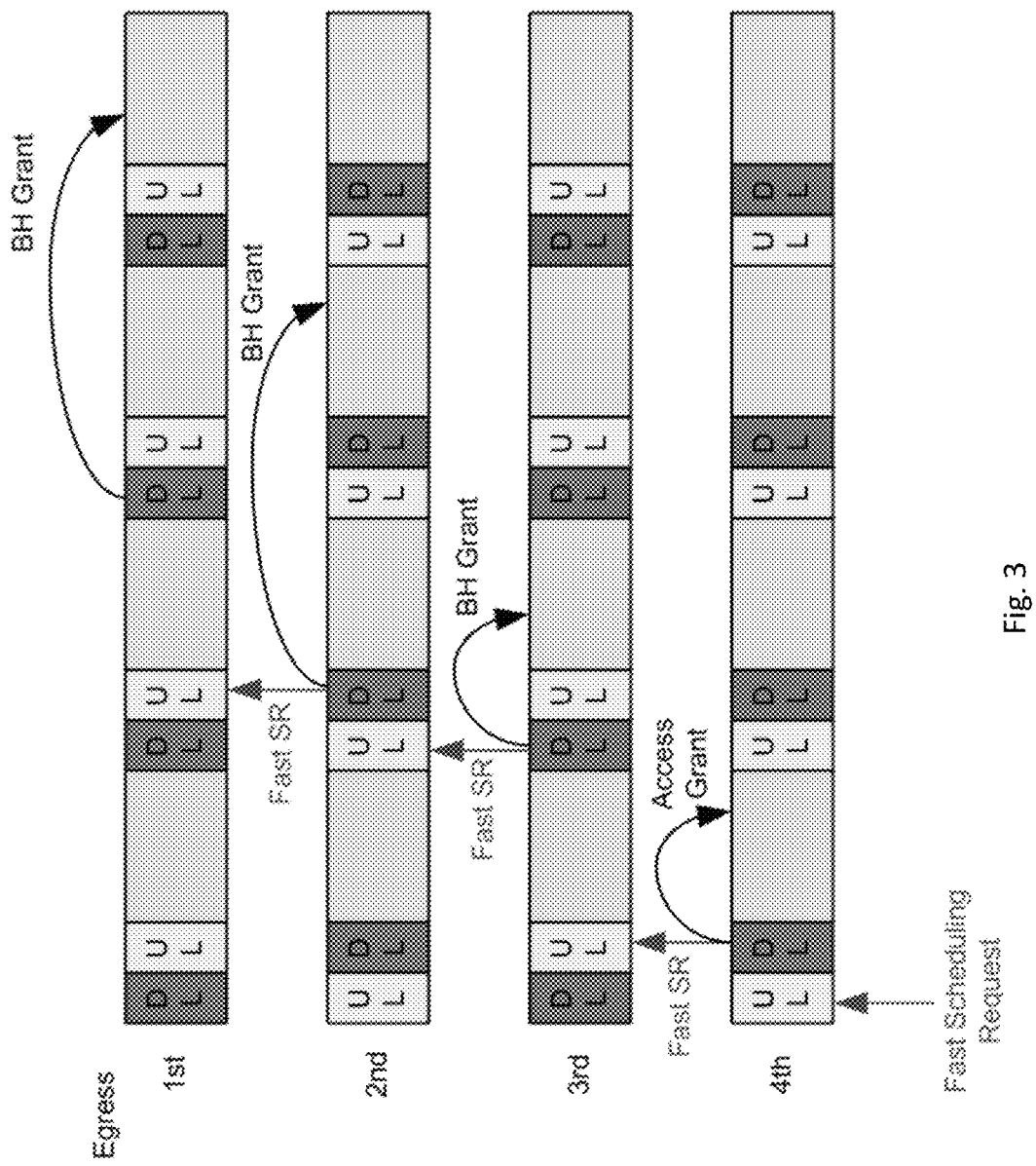
FIG. 3 illustrates a system that utilizes a plurality of tiers in accordance with one embodiment.

FIG. 3 illustrates a system that utilizes a plurality of tiers in accordance with one embodiment. As shown in FIG. 3, an embodiment of the present invention can utilize a plurality of tiers (e.g., four tiers) within the backhaul cluster. As shown in FIG. 3, in one embodiment, a fourth-tier AP can transmit a scheduling request (SR) to a third-tier AP as soon as possible after receiving a scheduling request for fast data transmission from the user equipment (UE). The fourth-tier AP can then schedule the UE to transmit the data. The third-tier AP, likewise, can pre-request a scheduling assignment from the second-tier AP, and so on. After receiving the data from the UE, the fourth-tier AP forwards the transmission directly to the third-tier AP, and so on. As illustrated by this example, the delay between when the UE sends a scheduling request to the fourth-tier AP to when data arrives at the egress point is 4 slots. Without using embodiments of the present invention, the delay for uplink transmission per AP is approximately 4 slots. Therefore, as shown by this example, delay/latency is reduced by 75%.

When the "fast" scheduling request method is used in accordance with one embodiment, data may be forwarded right away, prior to decoding the data by each AP. If the data cannot be decoded at the egress point, the data may be corrected using Automatic-Repeat-Request (ARQ). While ARQ is generally slower than HARQ, ARQ may not be slower in some cases because the multiple hops can add delay to HARQ as well.

In the event that sub-optimal MCS selection and scheduling occurs, in a mmWave system, the channel may change slowly and many connections may enjoy line-of-sight components. Therefore, any loss resulting from suboptimal MCS selection can be expected to be small.

In view of the above, some performance losses may occur in order to minimize latency. However, because the bandwidth for a mmWave system is quite large (1-2 GHz) with data rates in the Gbps, use of embodiments of the present invention generally does not result in any noticeable impact on user throughput experience.

In view of the above, in embodiments of the present invention, two different scheduling requests are proposed-a normal scheduling request and a fast scheduling request. The fast scheduling request is generally used when high packet latency is not acceptable, while the normal scheduling request is generally used when some packet latency is acceptable.

In another embodiment, the scheduling request can include a best beam as measured by the UE. This may be beneficial for mmWave where Radio-Frequency (RF) beamforming is used so that the evolved Node B (eNB) will have the latest information regarding a preferred beam.

One advantage of using an embodiment of the present invention includes reducing latency through pre-requesting scheduling assignment from the backhaul. When using embodiments of the present invention, an approximate latency reduction of 50%-75% can be achieved, depending on the number of hops.

Figure 4:
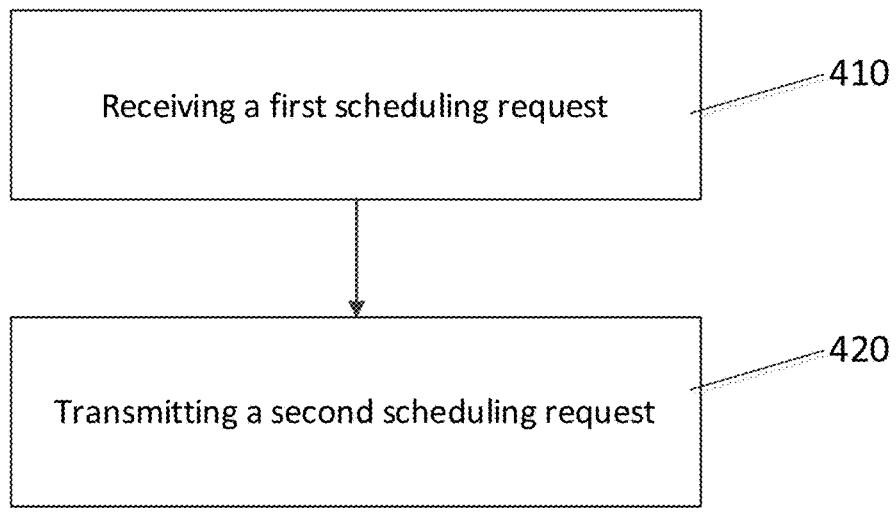
FIG. 4 illustrates a flow diagram of a method according to one embodiment.

FIG. 4 illustrates a logic flow diagram of a method according to certain embodiments of the invention. The method illustrated in FIG. 4 includes, at 410, receiving, by a first access point, a first scheduling request. The first scheduling request corresponds to a request for the first access point to process data. The method also includes, at 420, transmitting a second scheduling request. The second scheduling request corresponds to a request to transmit data to a second access point. The transmitting the second scheduling request includes transmitting the second scheduling request before the data is processed at the first access point.

Figure 5:
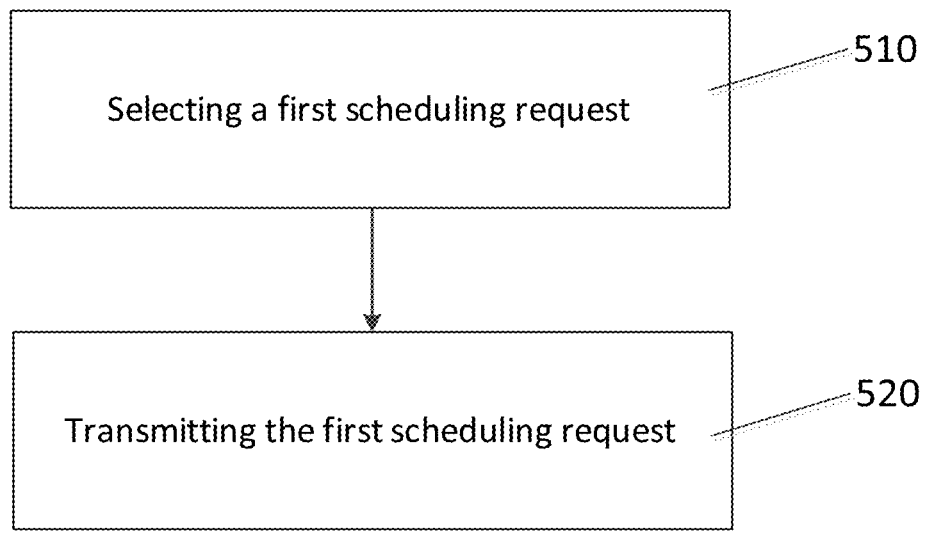
FIG. 5 illustrates a flow diagram of another method according to one embodiment.

FIG. 5 illustrates a logic flow diagram of a method according to certain embodiments of the invention. The method illustrated in FIG. 5 includes, at 510, selecting a first scheduling request. The selecting the first scheduling request includes selecting between scheduling request types. The method also includes, at 520, transmitting the first scheduling request to an access point. The first scheduling request corresponds to a request for the access point to process data.

Figure 6:
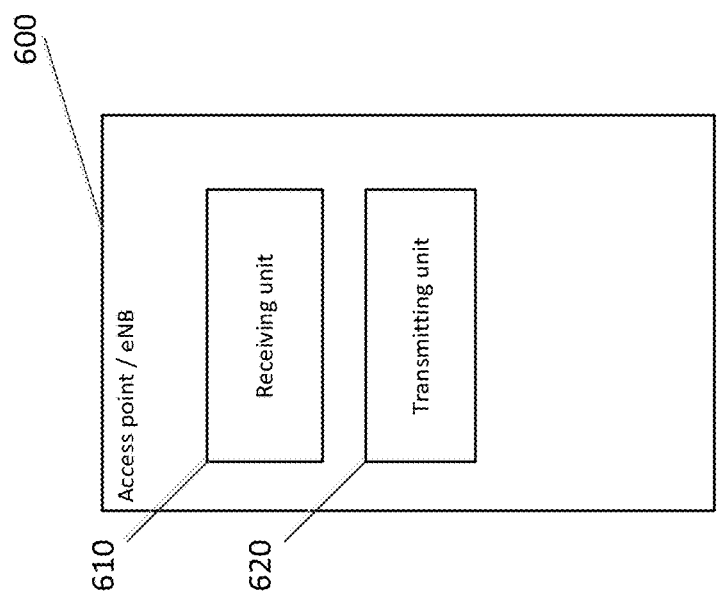
FIG. 6 illustrates an apparatus in accordance with one embodiment.

FIG. 6 illustrates an apparatus in accordance with one embodiment. Apparatus 600 includes a receiving unit 610 that receives a first scheduling request. The first scheduling request corresponds to a request for the apparatus 600 to process data. Apparatus 600 also includes a transmitting unit 620 that transmits a second scheduling request. The second scheduling request corresponds to a request to transmit data to an access point. The transmitting the second scheduling request includes transmitting the second scheduling request before the data is processed at the apparatus 600.

Figure 7:
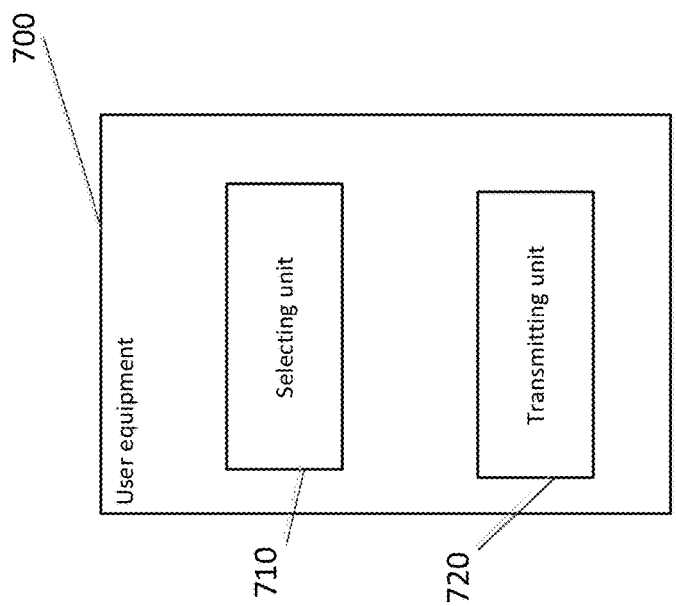
FIG. 7 illustrates an apparatus in accordance with another embodiment.

FIG. 7 illustrates an apparatus in accordance with one embodiment. The apparatus 700 includes a selecting unit 710 that selects a first scheduling request. The selecting the first scheduling request includes selecting between scheduling request types. The apparatus 700 also includes a transmitting unit 720 that transmits the first scheduling request to an access point. The first scheduling request corresponds to a request for the access point to process data.

Figure 8:
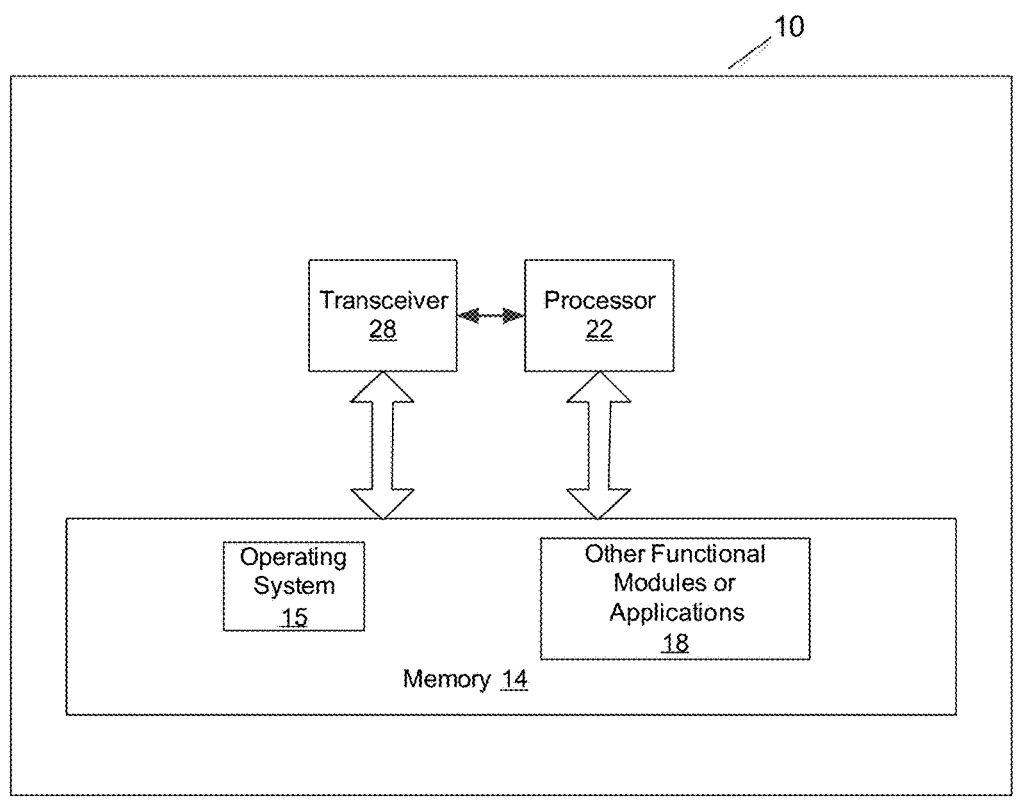
FIG. 8 illustrates an apparatus in accordance with another embodiment.

FIG. 8 illustrates an apparatus 10 according to embodiments of the invention. Apparatus 10 can be a device, such as a UE, for example. In other embodiments, apparatus 10 can be an access point, an evolved Node B, and/or a base station, for example.

Apparatus 10 can include a processor 22 for processing information and executing instructions or operations. Processor 22 can be any type of general or specific purpose processor. While a single processor 22 is shown in FIG. 8, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In certain embodiments, memory 14 stores software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 9:
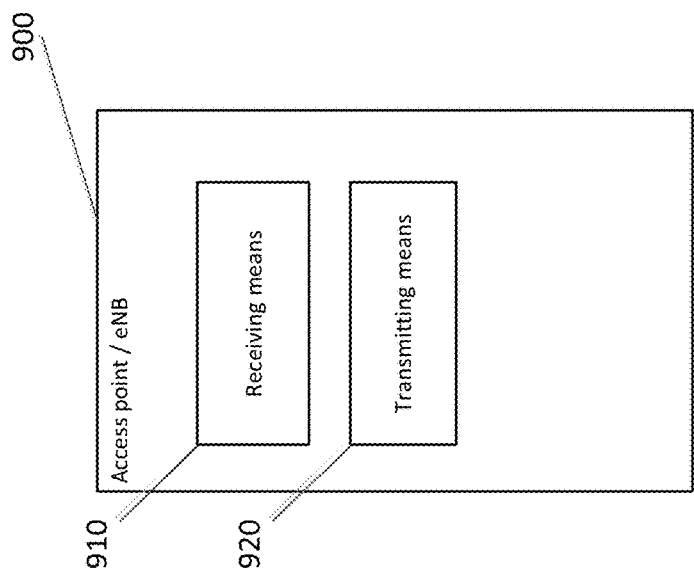
FIG. 9 illustrates an apparatus in accordance with another embodiment.

FIG. 9 illustrates an apparatus in accordance with one embodiment. Apparatus 900 includes a receiving means 910 for receiving a first scheduling request. The first scheduling request corresponds to a request for the apparatus 900 to process data. Apparatus 900 also includes a transmitting means 920 for transmitting a second scheduling request. The second scheduling request corresponds to a request to transmit data to an access point. The transmitting the second scheduling request includes transmitting the second scheduling request before the data is processed at the apparatus 900.

Figure 10:
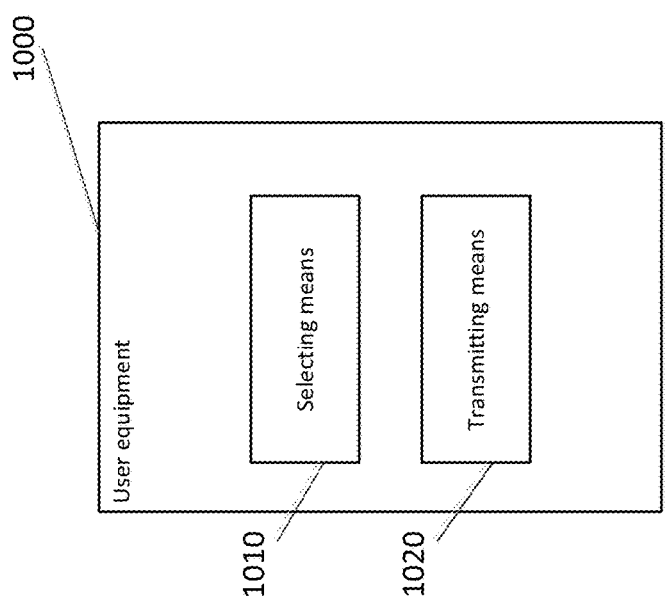
FIG. 10 illustrates an apparatus in accordance with another embodiment.

FIG. 10 illustrates an apparatus in accordance with one embodiment. The apparatus 1000 includes a selecting means 1010 for selecting a first scheduling request. The selecting the first scheduling request includes selecting between scheduling request types. The apparatus 1000 also includes a transmitting means 1020 for transmitting the first scheduling request to an access point. The first scheduling request corresponds to a request for the access point to process data.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, by a first access point, a first scheduling request, wherein the first scheduling request corresponds to a request for the first access point to process data;
   transmitting, by the first access point, a second scheduling request, wherein the second scheduling request corresponds to a request to transmit data to a second access point, the transmitting the second scheduling request comprises transmitting the second scheduling request before the data is processed at the first access point, the first access point is configured to adapt between a fast-scheduling request and a regular-scheduling request, and the first access point (1) determines that the fast-scheduling request is to be used, and/or (2) receives an indication that the fast-scheduling request is to be used; and
   transmitting data to the second access point before decoding the data, when the fast-scheduling request is determined or indicated.

2. The method according to claim 1, wherein the processing data by the first access point comprises at least one of receiving the data or decoding the data.

3. The method according to claim 1, further comprising processing data at the first access point and transmitting the data to the second access point, wherein the transmission of the data corresponds to a hop of a multi-hop transmission.

4. The method according to claim 1, wherein the first access point corresponds to a tier of a multi-tier topology.

5. The method according to claim 3, wherein the data is transmitted towards an egress point.

6. The method of claim 1, wherein transmitting the second scheduling request comprises transmitting a scheduling request that indicates one or more of priority, packet destination, routing information, or configuration parameters.

7. The method of claim 1, wherein the first access point comprises an access point of a mmWave system.

8. The method of claim 3, wherein the data is transmitted to the second access point after the processing the data at the first access point.

9. The method of claim 3, wherein the data is transmitted using unacknowledged mode.

10. The method of claim 1, further comprising determining, by the first access point, whether data is intended for the network based on the format or content of the first scheduling request.

11. The method of claim 5, further comprising adjusting, by the first access point, data packet configuration parameters based on the format or content of the first scheduling request.

12. The method of claim 5, further comprising correcting, by the first access point, the data using Automatic-Repeat-Request if the data cannot be decoded at the egress point.

13. An apparatus, comprising:
at least one processor; and
at least one memory including computer program code,
the at least one memory and the computer program code configured, with the at least one processor, to cause the apparatus at least to
receive a first scheduling request, wherein the first scheduling request corresponds to a request for the apparatus to process data;
transmit a second scheduling request, wherein the second scheduling request corresponds to a request to transmit data to an access point, the transmitting the second scheduling request comprises transmitting the second scheduling request before the data is processed at the apparatus, the apparatus is configured to adapt between a fast-scheduling request and a regular-scheduling request, and the apparatus (1) determines that the fast-scheduling request is to be used, and/or (2) receives an indication that the fast-scheduling request is to be used; and
transmit data to the second access point before decoding the data, when the fast-scheduling request is determined or indicated.

14. The apparatus according to claim 13, wherein the processing data by the apparatus comprises at least one of receiving the data or decoding the data.

15. The apparatus according to claim 13, wherein the apparatus is further caused to process data and transmit the data to the access point, wherein the transmission of the data corresponds to a hop of a multi-hop transmission.

16. The apparatus according to claim 13, wherein the apparatus corresponds to a tier of a multi-tier topology.

17. The apparatus according to claim 15, wherein the data is transmitted towards an egress point.

18. The apparatus according to claim 13, wherein transmitting the second scheduling request comprises transmitting a scheduling request that indicates one or more of priority, packet destination, routing information, or configuration parameters.

19. The apparatus according to claim 13, wherein the apparatus comprises an access point of a mmWave system.

20. The apparatus according to claim 15, wherein the data is transmitted to the access point after the processing the data at the apparatus.

21. The apparatus according to claim 15, wherein the data is transmitted using unacknowledged mode.

22. The apparatus of claim 13, wherein the apparatus is further caused to determine whether data is intended for the network based on the format or content of the first scheduling request.

23. The apparatus of claim 17, wherein the apparatus is further caused to adjust data packet configuration parameters based on the format or content of the first scheduling request.

24. The apparatus of claim 17, wherein the apparatus is further caused to correct the data using Automatic-Repeat-Request if the data cannot be decoded at the egress point.

25. A computer program product, embodied on a non-transitory computer readable medium, the computer program product configured to control a processor to perform a process, comprising:
receiving, by a first access point, a first scheduling request, wherein the first scheduling request corresponds to a request for the first access point to process data;
transmitting, by the first access point, a second scheduling request, wherein the second scheduling request corresponds to a request to transmit data to a second access point, the transmitting the second scheduling request comprises transmitting the second scheduling request before the data is processed at the first access point, the first access point is configured to adapt between a fast-scheduling request and a regular-scheduling request, and the first access point (1) determines that the fast-scheduling request is to be used, and/or (2) receives an indication that the fast-scheduling request is to be used; and
transmitting data to the second access point before decoding the data, when the fast-scheduling request is determined or indicated.

26. A method, comprising:
selecting, by a user equipment, a first scheduling request, wherein the selecting the first scheduling request comprises selecting between scheduling request types; and
transmitting the first scheduling request to an access point, wherein the first scheduling request corresponds to a request for the access point to process data, the selecting between scheduling request types comprises selecting between a fast-scheduling request and a regular-scheduling request, and the first scheduling request causes the access point to transmit data before decoding the data, when the fast-scheduling request is selected.

27. The method of claim 26, further comprising transmitting data to the access point, wherein transmitting the first scheduling request to the access point causes the access point to transmit a second scheduling request before processing the transmitted data, wherein the processing of the transmitted data by the access point comprises at least one of receiving the transmitted data or decoding the transmitted data.

28. The method of claim 26, wherein the transmitting of the data corresponds to a hop of a multi-hop transmission.

29. The method of claim 26, wherein the transmitting of the data is transmitting towards an egress point.

30. The method of claim 26, wherein the selecting the first scheduling request is based on one or more of destination, priority, type, and delay budget of the data.

31. The method of claim 26, wherein a modulation-and-coding-scheme is based on the scheduling request type.

32. The method of claim 29, further comprising correcting, by the user equipment, the data using Automatic-Repeat-Request if the data cannot be decoded at the egress point.

33. An apparatus, comprising:
at least one processor; and
at least one memory including computer program code,
the at least one memory and the computer program code configured, with the at least one processor, to cause the apparatus at least to
select a first scheduling request, wherein the selecting the first scheduling request comprises selecting between scheduling request types; and
transmit the first scheduling request to an access point, wherein the first scheduling request corresponds to a request for the access point to process data, the selecting between scheduling request types comprises selecting between a fast-scheduling request and a regular-scheduling request, and the first scheduling request causes the access point to transmit data before decoding the data, when the fast-scheduling request is selected.

34. The apparatus of claim 33, wherein the apparatus is further caused to transmit data to the access point, wherein transmitting the first scheduling request to the access point causes the access point to transmit a second scheduling request before processing the transmitted data, wherein the processing of the transmitted data by the access point comprises at least one of receiving the transmitted data or decoding the transmitted data.

35. The apparatus of claim 33, wherein the transmitting of the data corresponds to a hop of a multi-hop transmission.

36. The apparatus of claim 33, wherein the transmitting of the data is transmitting towards an egress point.

37. The apparatus of claim 33, wherein the selecting the first scheduling request is based on one or more of destination, priority, type, and delay budget of the data.

38. The apparatus of claim 33, wherein a modulation-and-coding-scheme is based on the scheduling request type.

39. The apparatus of claim 36, wherein the apparatus is further caused to correct the data using Automatic-Repeat-Request if the data cannot be decoded at the egress point.

40. A computer program product, embodied on a non-transitory computer readable medium, the computer program product configured to control a processor to perform a process, comprising:

selecting, by a user equipment, a first scheduling request, wherein the selecting the first scheduling request comprises selecting between scheduling request types; and transmitting the first scheduling request to an access point, wherein the first scheduling request corresponds to a request for the access point to process data, and the first scheduling request causes the access point to transmit data before decoding the data, when the fast-scheduling request is selected.

* * * * *